(12) United States Patent
Cho et al.

(10) Patent No.: US 10,998,599 B2
(45) Date of Patent: May 4, 2021

(54) LITHIUM SECONDARY BATTERY

(71) Applicant: SK Innovation Co., Ltd., Seoul (KR)

(72) Inventors: Yong Hyun Cho, Daejeon (KR); Jae Woong Kim, Daejeon (KR); Min Gu Kang, Daejeon (KR); Young Hoon Do, Daejeon (KR); Whee Sung Kim, Daejeon (KR)

(73) Assignee: SK Innovation Co., Ltd., Seoul (KR)

( * ) Notice: Subject to any disclaimer, the term of this patent is extended or adjusted under 35 U.S.C. 154(b) by 315 days.

(21) Appl. No.: 15/889,456

(22) Filed: Feb. 6, 2018

(65) Prior Publication Data

US 2018/0226623 A1 Aug. 9, 2018

(30) Foreign Application Priority Data

Feb. 9, 2017 (KR) .................. 10-2017-0017906

(51) Int. Cl.
*H01M 50/411* (2021.01)
*H01M 10/0525* (2010.01)
*H01M 10/0585* (2010.01)
*H01M 10/04* (2006.01)
*H01M 10/42* (2006.01)

(52) U.S. Cl.
CPC ..... *H01M 50/411* (2021.01); *H01M 10/0436* (2013.01); *H01M 10/0459* (2013.01); *H01M 10/0525* (2013.01); *H01M 10/0585* (2013.01); *H01M 10/4235* (2013.01); *H01M 2220/30* (2013.01)

(58) Field of Classification Search
CPC .......... H01M 10/0585; H01M 2/1653; H01M 10/0459; H01M 10/0525; H01M 50/411
See application file for complete search history.

(56) References Cited

U.S. PATENT DOCUMENTS

| | | | |
|---|---|---|---|
| 9,425,453 B2 | 8/2016 | Han et al. | |
| 2008/0213671 A1* | 9/2008 | Kogetsu | H01M 10/0525 429/246 |
| 2013/0101881 A1* | 4/2013 | Syed | H01M 10/643 429/120 |
| 2014/0072850 A1 | 3/2014 | Kwon et al. | |
| 2014/0087224 A1* | 3/2014 | Kim | H01M 2/266 429/94 |
| 2016/0028065 A1* | 1/2016 | Park | H01M 2/14 429/144 |

FOREIGN PATENT DOCUMENTS

| | | |
|---|---|---|
| JP | 20140087774 A | 7/2014 |
| JP | 2015513772 A | 5/2015 |
| KR | 20150083281 A | 7/2014 |
| KR | 1020150045737 A | 4/2015 |

\* cited by examiner

*Primary Examiner* — James Lee
(74) *Attorney, Agent, or Firm* — The Webb Law Firm

(57) ABSTRACT

A lithium secondary battery includes a plurality of electrode cells, each of which includes a first electrode, a second electrode having a different polarity from that of the first electrode and a separation layer interposed between the first electrode and the second electrode, and at least one ion permeation barrier between neighboring ones of the electrode cells. The ion permeation barrier has an air permeability less than that of the separation layer.

15 Claims, 4 Drawing Sheets

LITHIUM SECONDARY BATTERY

CROSS-REFERENCE TO RELATED APPLICATION

This application claims priority to Korean Patent Application No. 10-2017-0017906 filed Feb. 9, 2017, the disclosure of which is hereby incorporated in its entirety by reference.

BACKGROUND

1. Field

The present invention relates to a lithium secondary battery. More particularly, the present invention relates to a lithium secondary battery including a plurality of insulation layers and conductive layers.

2. Description of the Related Art

A secondary battery which can be charged and discharged repeatedly has been widely employed as a power source of a mobile electronic device such as a camcorder, a mobile phone, a laptop computer, etc., according to developments of information and display technologies. Recently, a battery pack including the secondary battery is being developed and applied as a power source of an eco-friendly vehicle such as a hybrid automobile.

The secondary battery includes, e.g., a lithium secondary battery, a nickel-cadmium battery, a nickel-hydrogen battery, etc. The lithium secondary battery is highlighted due to high operational voltage and energy density per unit weight, a high charging rate, a compact dimension, etc.

For example, the lithium secondary battery may include an electrode assembly including a cathode, an anode and a separation layer, and an electrolyte immersing the electrode assembly. The lithium secondary battery may further include an outer case having, e.g., a pouch shape.

As an application range of the lithium secondary battery has been expanded, a long life span, a high capacity and an operational stability are required. Recently, a method of decreasing an explosion of the battery due to a short-circuit of the electrodes occurring when an external object penetrates has been researched.

For example, Korean Publication of Patent Application No, 10-2015-0045737 discloses a conductive structure such as a fuse for a rapid discharge of energy when the penetration occurs.

SUMMARY

According to an aspect of the present invention, there is provided a lithium secondary battery having improved operational and electrical stability.

According to example embodiments, a lithium secondary battery comprises a plurality of electrode cells, each of which includes a first electrode, a second electrode having a different polarity from that of the first electrode and a separation layer interposed between the first electrode and the second electrode, and at least one ion permeation barrier between neighboring ones of the electrode cells, the ion permeation barrier having an air permeability less than that of the separation layer.

In some embodiments, the ion permeation barrier may have a porosity less than that of the separation layer.

In some embodiments, the separation layer may include a polymer film prepared from at least one of polyethylene, polypropylene, polyvinylidene fluoride, polyethylene oxide or polyacrylonitrile, and the ion permeation barrier may include at least one of a polyester-based resin, a polyurethane-based resin, a polyimide-based resin, polyethylene terephthalate (PET), polymethyl methacrylate (PMMA), a polypropylene film filled with an inorganic material or aramid.

In some embodiments, the first electrode and the second electrode face each other with respect to the ion permeation barrier.

In some embodiments, the ion permeation barrier may be disposed per each space between the electrode cells.

In some embodiments, the first electrodes and the second electrodes face each other with respect to the ion permeation barrier alternately along a thickness direction of the lithium secondary battery.

In some embodiments, the lithium secondary battery may further include a case housing the electrode cells and the ion permeation barrier, an electrolyte injected in the case, and a first electrode tap and a second electrode tap extending from each of the first electrode and the second electrode, respectively, to an outside of the case.

In some embodiments, the ion permeation barrier may at least partially overlap the first electrode tap and the second electrode tap in the case along a thickness direction of the lithium secondary battery.

In some embodiments, an electrode tap region may be defined between end portions of the electrode cell and the case, and a portion of the ion permeation barrier may extend to the electrode tap region.

In some embodiments, the ion permeation barrier may have a length in an extending direction of the first and second electrode taps larger than that of the separation layer.

In some embodiments, the separation layer may have a length in a width direction of the lithium secondary battery larger than that of the ion permeation barrier.

In some embodiments, the separation layer may extend in a zigzag shape along the thickness direction and the width direction by a connecting portion.

In some embodiments, the first electrode may include a first current collector and a first electrode active material layer coated thereon, the second electrode may include a second current collector and a second electrode active material layer coated thereon, and the first electrode active material layer and the second electrode active material layer may be coated on both surfaces or a single surface of the first current collector and the second current collector, respectively.

In some embodiments, the first electrode which contacts the ion permeation barrier may include the first electrode active material layer which is coated on the single surface of the first current collector, and the second electrode which contacts the ion permeation barrier may include the second electrode active material layer which is coated on the single surface of the second current collector.

In some embodiments, the ion permeation barrier may directly contact the first current collector or the second current collector.

According to exemplary embodiments of the present invention, an ion permeation barrier may be formed per each electrode cell to serve as a penetration barrier. The ion permeation barrier may have a permeability and/or a porosity less than those of a separator included in the electrode cell. Thus, the electrode cells may be stacked in a parallel arrangement so that a heat generation, a charging and discharging failure and a degradation of a battery operation may be effectively prevented when an external object penetrates through the battery.

The ion permeation barrier may expand to overlap electrode taps, and a reduction of a battery reliability at a lateral or an end portion of a battery case may be avoided.

DETAILED DESCRIPTION OF THE EMBODIMENTS

According to example embodiments of the present invention, a lithium secondary battery having improved operational reliability even when a penetration occurs is provided. The lithium secondary battery may include electrode cells each of which includes a first electrode, a second electrode having a different polarity from the first electrode, and a separation layer interposed between the first electrode and the second electrode; and at least one ion permeation barrier between the electrode cells. The ion permeation barrier may have a lower permeability than that of the separation layer.

Hereinafter, the present invention will be described in detail with reference to the accompanying drawings. However, those skilled in the art will appreciate that such embodiments described with reference to the accompanying drawings are provided to further understand the spirit of the present invention and do not limit subject matters to be protected as disclosed in the detailed description and appended claims.

Figure 1:
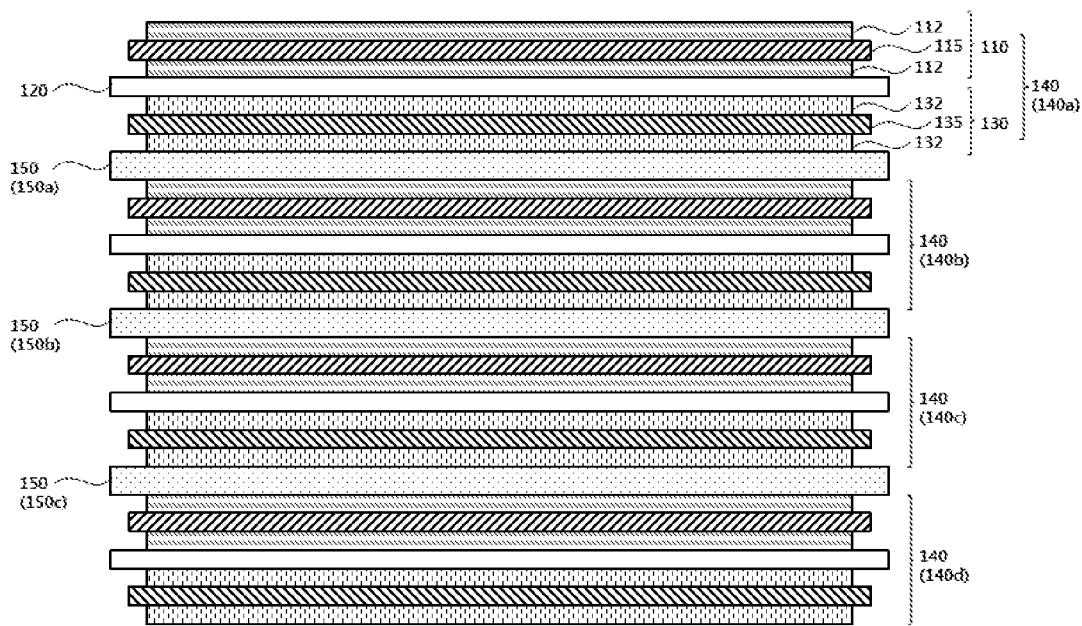
FIG. 1 is a schematic cross-sectional view illustrating a lithium secondary battery in accordance with exemplary embodiments.

FIG. 1 is a schematic cross-sectional view illustrating a lithium secondary battery in accordance with exemplary embodiments. Referring to FIG. 1, the lithium secondary battery may include an electrode assembly (e.g., a jelly roll) including a plurality of electrode cells, and an ion permeation barrier 150.

The electrode assembly may include a laminate or a stack of the electrode cells 140. Each electrode cell 140 may include a first electrode 110 and a second electrode 130 facing each other with respect to a separation layer 120.

The first electrode 110 may include a first current collector 115 and a first electrode active material layer 112 formed on the first current collector 115. For example, the first electrode 110 may serve as a cathode of the lithium secondary battery.

The first current collector 115 may include a metal which may not be reactive within a voltage range of the lithium secondary battery and may be easily coated by an electrode active material. For example, the first current collector 115 may include stainless steel, nickel, aluminum, titanium or an alloy thereof; or aluminum or stainless steel which may be surface-treated by carbon, nickel, titanium, silver, etc. In some embodiments, the first current collector 115 may serve as a cathode current collector, and may include aluminum or an aluminum alloy.

The first electrode active material layer 112 may include, e.g., a cathode active material. In this case, the first electrode active material layer 112 may include a lithium metal oxide-based active material such as lithium cobalt-based oxide, lithium nickel-based oxide, lithium manganese-based oxide, lithium-vanadium-based oxide, etc.

The first electrode active material layer 112 may be formed on at least one surface of the first current collector 115. For example, as illustrated in FIG. 1, the first electrode active material layer 112 may be formed on top and bottom surfaces of the first current collector 115.

In some embodiments, an electrode slurry including the first electrode active material may be coated on at least one surface of the first current collector 115, dried and pressed using a roller to form the first electrode 110. The electrode slurry may be prepared by mixing the first electrode active material in a solvent together with, e.g., a binder, a conductive additive and/or a dispersing agent.

The binder may include an organic-based binder such as a polyvinylidene fluoride-hexafluoropropylene copolymer (PVDF-co-HFP), polyvinylidenefluoride (PVDF), polyacrylonitrile, polymethylmethacrylate, etc., or an aqueous based binder such as styrene-butadiene rubber (SBR) that may be used with a thickener such as carboxymethyl cellulose (CMC).

The conductive additive may be added to facilitate an electron mobility between the electrodes. For example, the conductive additive may include a carbon-based material such as graphite, carbon black, graphene, carbon nanotube, etc., and/or a metal-based material such as tin, tin oxide, titanium oxide, a perovskite material such as $LaSrCoO_3$ or $LaSrMnO_3$.

The solvent may include a non-aqueous solvent such as N-methyl-2-pyrrolidone (NMP), dimethylformamide, dimethylacetamide, N,N-dimethylaminopropylamine, ethylene oxide, tetrahydrofuran (THF), or the like.

The second electrode 130 may include a second current collector 135 and a second electrode active material layer 132 formed on the second current collector 135. For example, the second electrode 130 may serve as an anode of the lithium secondary battery.

For example, the second current collector 135 may include stainless steel, nickel, aluminum, titanium or an alloy thereof; or aluminum or stainless steel which may be surface-treated by carbon, nickel, titanium, silver, etc. In some embodiments, the second current collector 135 may serve as an anode current collector, and may include copper or a copper alloy.

The second electrode active material layer 132 may include, e.g., an anode active material. In this case, the second electrode active material layer 132 may include a carbon-based material such as a crystalline carbon, an amorphous carbon, a carbon complex or a carbon fiber, a lithium alloy, silicon, tin, etc. The amorphous carbon may include a hard carbon, cokes, a mesocarbon microbead (MCMB), a mesophase pitch-based carbon fiber (MPCF), etc. The crystalline carbon may include a graphite-based material such as natural graphite, graphitized cokes, graphitized MCMB, graphitized MPCF, etc. The lithium alloy may further include aluminum, zinc, bismuth, cadmium, antimony, silicon, lead, tin, gallium and/or indium.

The second electrode active material layer 132 may be formed on at least one surface of the second current collector 135. In some embodiments, as illustrated in FIG. 1, the second electrode active material layer 132 may be formed on top and bottom surfaces of the second current collector 135. The second electrode active material layer 132 may be formed by a process substantially the same as or similar to that of the first electrode active material layer 112.

The first electrode 110 and the second electrode 130 may be disposed on a top surface and a bottom surface of the separation layer 120, respectively. The separation layer 120 may serve as a separator preventing a short-circuit between the first electrode 110 and the second electrode 130, and may also serve as a lithium ion path between the first electrode 110 and the second electrode 130.

The separation layer 120 may be formed of an insulation and porous material through which ions may be transferred between the first electrode 110 and the second electrode 130. For example, an insulation thin resin film having high ion permeability and mechanical strength may be used. Non-limiting examples of the material for the separation layer 120 may include an olefin-based polymer such as polypropylene, a sheet including glass fiber or polyethylene, a polymer film containing a non-woven fabric or an inorganic material, etc. If a solid electrolyte such as polymer is employed as the electrolyte of the lithium secondary battery, the solid electrolyte may also serve as the separation layer.

In an embodiment, the separation layer 120 may include a multi-layered film prepared from a polyethylene film, a polypropylene film or a combination thereof, or a polymer film prepared from polyvinylidene fluoride, polyethylene oxide, polyacrylonitrile, or a polyvinylidene fluoride hexafluoropropylene copolymer, etc.

A plurality of the electrode cells 140 having elements and constructions as described above may be stacked, and at least one ion permeation barrier 150 may be interposed between the electrode cells 140 neighboring each other. In exemplary embodiments, as illustrated in FIG. 1, the ion permeation barrier 150 may be inserted per each space between the electrode cells 140. For example, first to fourth electrode cells 140a, 140b, 140c and 140d may be stacked, and first to third ion permeation barriers 150a, 150b and 150c may be interposed between the electrode cells.

In exemplary embodiments, the ion permeation barrier 150 may include an insulation material having an air permeability (or a gurley) less than that of the separation layer 120. Further, the ion permeation barrier 150 may include a resin material having a porosity less than that of the separation layer 120.

In some embodiments, the ion permeation barrier 150 may include a polyester-based resin, a polyurethane-based resin, a polyimide-based resin, polyethylene terephthalate (PET), polymethyl methacrylate (PMMA), a polypropylene film filled with an inorganic material, aramid, etc. These may be used alone or in a combination thereof. In an embodiment, the ion permeation barrier 150 may include a high heat-resistant polymer having a melting point of about 300° C. or more.

In some embodiments, the air permeability of the separation layer 120 may be in a range from about 1/6 cc/sec to about 10 cc/sec. The air permeability of the ion permeation barrier 150 may be about 1/20 cc/sec or less. In some embodiments, the air permeability of the separation layer 120 may be reduced to about 1/20 cc/sec or less (e.g., about 1/30 cc/sec) depending on a material of the separation layer 120. In this case, for example, the air permeability of the ion permeation barrier 150 may be about 1/40 cc/sec or less or about 1/50 cc/sec or less.

The air permeability may be measured as a time required for a specific amount of an air having a constant pressure to pass through a film or a resin layer sample. For example, the air permeability may be measured using an air permeability tester such as Gurley Densometer based on, e.g., standards ASTM D726, BS5926, ISO 3636/5, etc.

As described above, the ion permeation barrier 150 may have the air permeability and/or the porosity less than those of the separation layer 120, and thus the ion permeation barrier 150 may have an ion conductivity and/or an ion permeability less than those of the separation layer 120. Accordingly, an ion permeation, an ion diffusion or an ion conduction between the electrode cells may be prevented by the ion permeation barrier 150, so that the electrode cells 140 may be substantially separated by the ion permeation barrier 150 to be connected in parallel. A parallel connection of the electrode cells 140 may be implemented to be advantageous from an aspect of a capacity of the secondary battery. Further, when an external object such as a nail or a spicule penetrates through the electrode assembly, an ion conduction between the electrode cells 140 may be blocked so that a heat generation caused by the penetration may be suppressed, and a charging/discharging failure due to an explosion or a temperature increase may be also prevented.

Additionally, the ion permeation barrier 150 having the low permeability and porosity may also serve as a barrier blocking a mass transfer or a mass diffusion. Thus, operational failures due to the mass transfer between the electrode cells may be avoided when the penetration occurs.

In some embodiments, a thickness of the ion permeation barrier 150 may be in a range from about 10 μm to about 100 μm. If the thickness of the ion permeation barrier 150 is less than about 10 μm, an ion permeation blocking or a parallel connection of the electrode cells may not be sufficiently implemented. If the thickness of the ion permeation barrier 150 exceeds about 100 μm, a capacity relative to a volume of the secondary battery may be excessively decreased.

In an embodiment, the thickness of the separation layer 120 may be in a range from about 10 μm to about 30 μm. The thickness of the separation layer 120 may be smaller than that of the ion permeation barrier 150 in consideration of an operational speed and a capacity of each electrode cell.

In some embodiments, electrodes having different polarities may face each other with respect to the ion permeation barrier 150. For example, as illustrated in FIG. 1, the second electrode 130 may be disposed on the ion permeation barrier 150, and the first electrode 110 may be disposed under the ion permeation barrier 150. For example, a top surface and a bottom surface of the ion permeation barrier 150 may be in contact with the second electrode active material layer 132 and the first electrode active material layer 112, respectively.

Accordingly, the parallel connection of the electrode cells may be implemented with high reliability.

Figure 2:
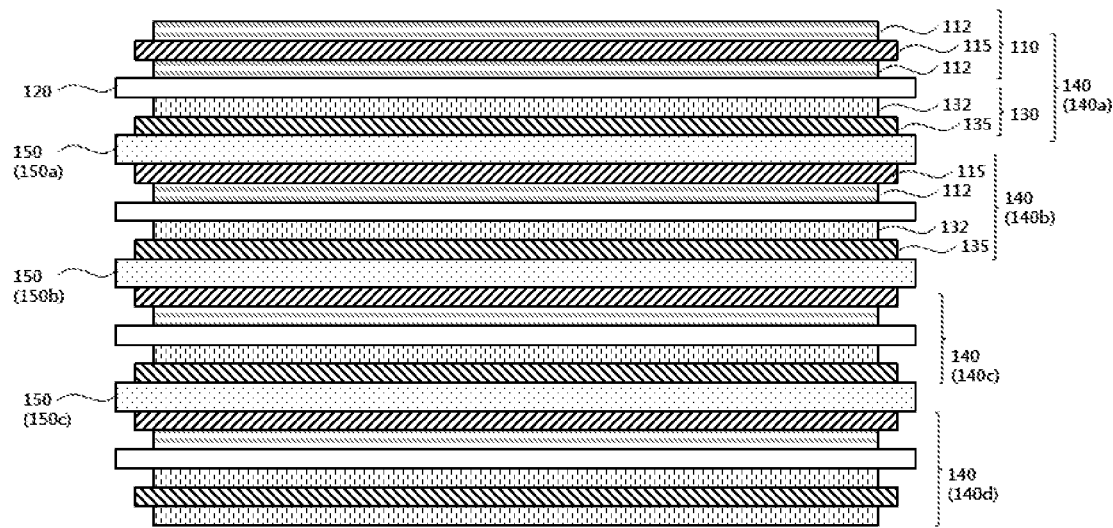
FIG. 2 is a schematic cross-sectional view illustrating a lithium secondary battery in accordance with some embodiments.

FIG. 2 is a schematic cross-sectional view illustrating a lithium secondary battery in accordance with some embodiments. Referring to FIG. 2, in the electrode contacting the ion permeation barrier 150, a single coating of an electrode active material layer is formed on a current collector.

For example, the electrode active material layer 132 and 112 may be omitted between the ion permeation barrier 150 and the current collector 135 and 115. In this case, top and bottom surfaces of the ion permeation barrier 150 may be in direct contact with the current collectors 135 and 115.

In an implementation illustrated in FIG. 2, the electrode active material layer that may contact the ion permeation barrier 150 and thus may be less effective in a capacity increase may be omitted so that a thickness of an electrode assembly or an entire battery may be reduced. Thus, a thickness or volume increase due to an addition of the ion permeation barrier 150 may be prevented while minimizing a capacity reduction. Further, the electrode active material layers 112 and 132 adjacent to the ion permeation barrier 150 may be omitted so that a mass transfer or an ion transfer between the electrode cells when the penetration occurs may be additionally reduced and failures by an ignition may be more effectively prevented.

Figure 3:
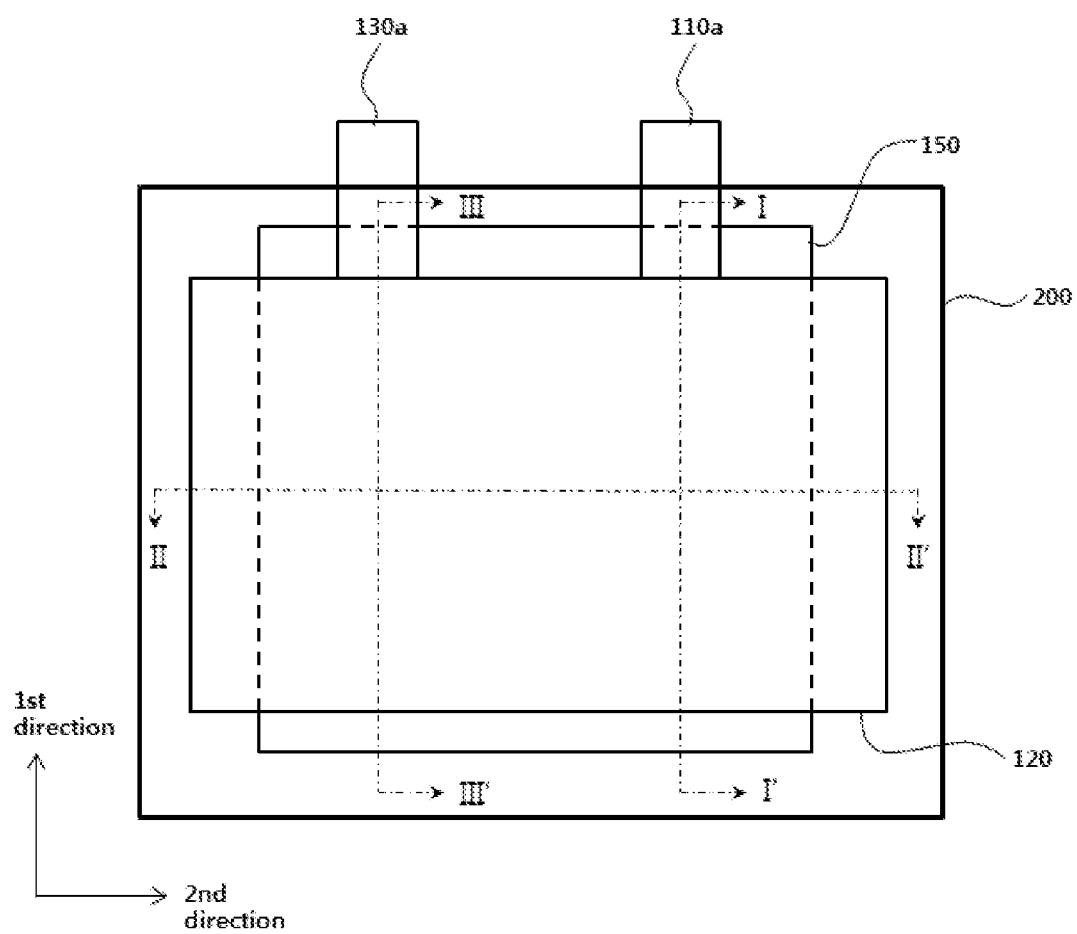
FIG. 3 is a schematic top plane view illustrating a lithium secondary battery in accordance with some embodiments.
Figure 4:
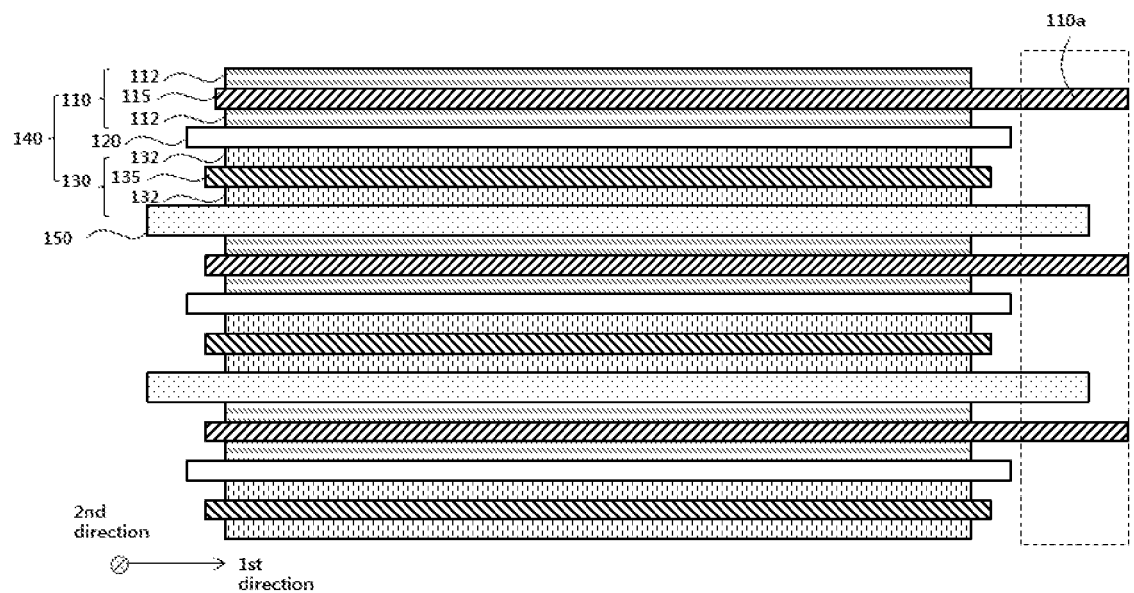
FIGS. 4 and 5 are schematic cross-sectional views illustrating a lithium secondary battery in accordance with some embodiments.
Figure 5:
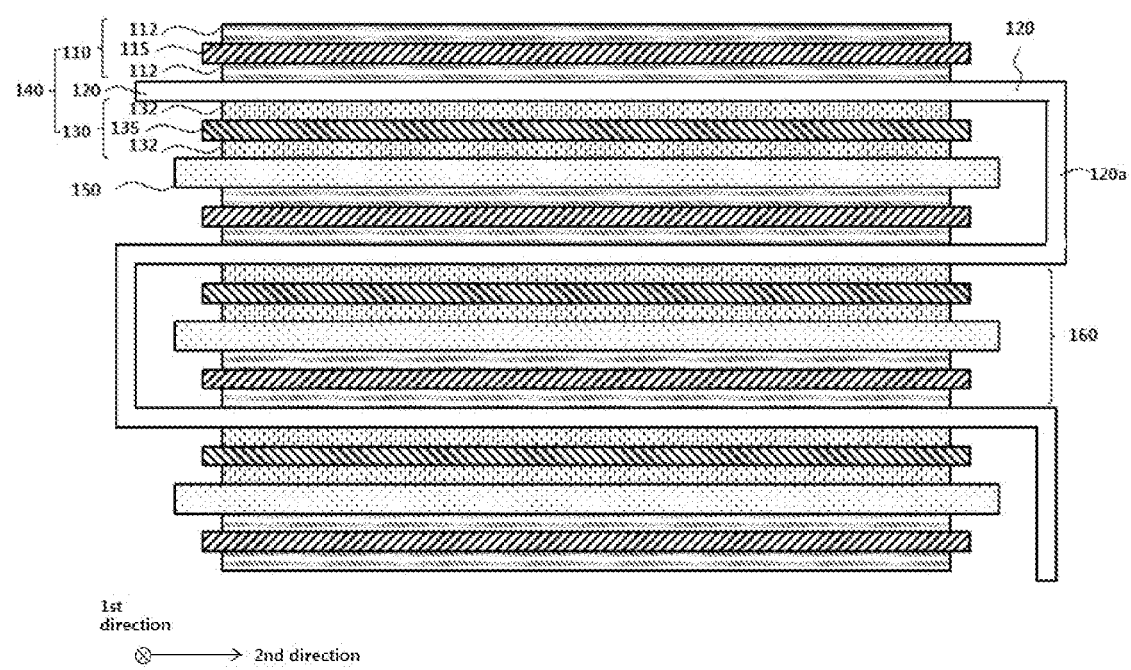

FIG. 3 is a schematic top plane view illustrating a lithium secondary battery in accordance with some embodiments. FIGS. 4 and 5 are schematic cross-sectional views illustrating a lithium secondary battery in accordance with some embodiments.

For example, FIG. 4 is a cross-sectional view taken along a line I-I' of FIG. 3. FIG. 5 is a cross-sectional view taken along a line II-IF of FIG. 3.

For convenience of descriptions, an illustration of a first electrode and a second electrode of an electrode assembly is omitted in FIG. 3. The number of electrode cells and ion permeation barriers illustrated in FIGS. 4 and 5 is merely exemplified, and may be additionally increased.

Two directions perpendicular to each other from a plane view of FIG. 3 are defined as a first direction and a second direction. For example, the first direction may be a direction in which an electrode tap of the secondary battery extends. The second direction may be a width direction of the secondary battery.

Referring to FIG. 3, for example, the electrode assembly and the ion permeation barrier 150 as described with reference to FIG. 1 may be accommodated in a case 200. The case may include a pouch, a can, etc.

In some embodiments, an electrolyte solution may be injected into the case 200. The electrolyte solution may include a non-aqueous electrolyte including a lithium salt as an electrolyte and an organic solvent. The organic solvent may include propylene carbonate (PC), ethylene carbonate (EC), diethyl carbonate (DEC), dimethyl carbonate (DMC), ethylmethyl carbonate (EMC), methylpropyl carbonate, dipropyl carbonate, dimethyl sulfoxide, acetonitrile, dimethoxy ethane, diethoxy ethane, vinylene carbonate, sulfolane, gamma-butyrolactone, propylene sulfite, tetrahydrofuran, etc. These may be used alone or in a combination thereof.

A first electrode tap 110a may extend from the first current collector 115 in the first direction. A second electrode tap 130a may extend from the second current collector 135 in the first direction.

The first and second electrode taps 110a and 130a may extend from an inside of the case 200, and portions thereof may be exposed to an outside of the case 200. As illustrated in FIG. 2, the first electrode tap 110a and the second electrode tap 130a may be positioned at the same side of the secondary battery or the case 200. However, the first electrode tap 110a and the second electrode tap 130a may be positioned at opposite sides of the secondary battery or the case 200 from each other. For example, the first electrode tap 110a and the second electrode tap 130a may be positioned at both end portions in the first direction of the case 200.

The first electrode tap 110a and the second electrode tap 130a may be formed at each electrode cell 140 included in the electrode assembly. A plurality of the first electrode portions 110a and a plurality of the second electrode portions 130a may be welded together at the end portion of the case 200 and may extend to the outside of the case 200.

As illustrated in FIG. 3, the ion permeation barrier 150 may cover the electrode assembly in a plane view, and may at least partially overlap the electrode taps 110a and 130a in the case 200. In some embodiments, the ion permeation barrier 150 may have a length in the first direction larger than that of the separation layer 120. For example, the ion permeation barrier 150 may protrude in the first direction from both end portions of the separation layer 120 in the plane view.

In an embodiment, the separation layer 120 may have a length in the second direction larger than that of the ion permeation barrier 150. For example, the separation layer 120 may protrude in the second direction from both lateral portions of the ion permeation barrier 150 in the plane view.

Referring to FIG. 4, end portions of the first electrode tap 110a and the ion permeation barrier 150 may overlap each other between end portions of the electrode assembly and the case 200. Thus, the ion permeation barrier 150 may serve as a penetration barrier in an electrode tap region (e.g., a region indicated by a dotted line) as well as in the electrode assembly.

Referring to FIG. 5, the separation layer 120 may extend in a zigzag shape along the second direction and a thickness direction of the secondary battery. For example, the separation layer 120 may be included in each electrode cell 140 and may continuously extend as a winding shape by a connecting portion 120a. For example, the ion permeation barrier 150 may be inserted at each winding region 160 of the separation layer 120.

The ion permeation barrier 150 may have a width (e.g., a width in the second direction) larger than each width of the first electrode 110 and the second electrode 130. Thus, a penetration barrier may be provided by an insulation structure including the ion permeation barrier 150 and the separation layer 120 at the end portions of the electrode assembly and the case 200.

Figure 6:
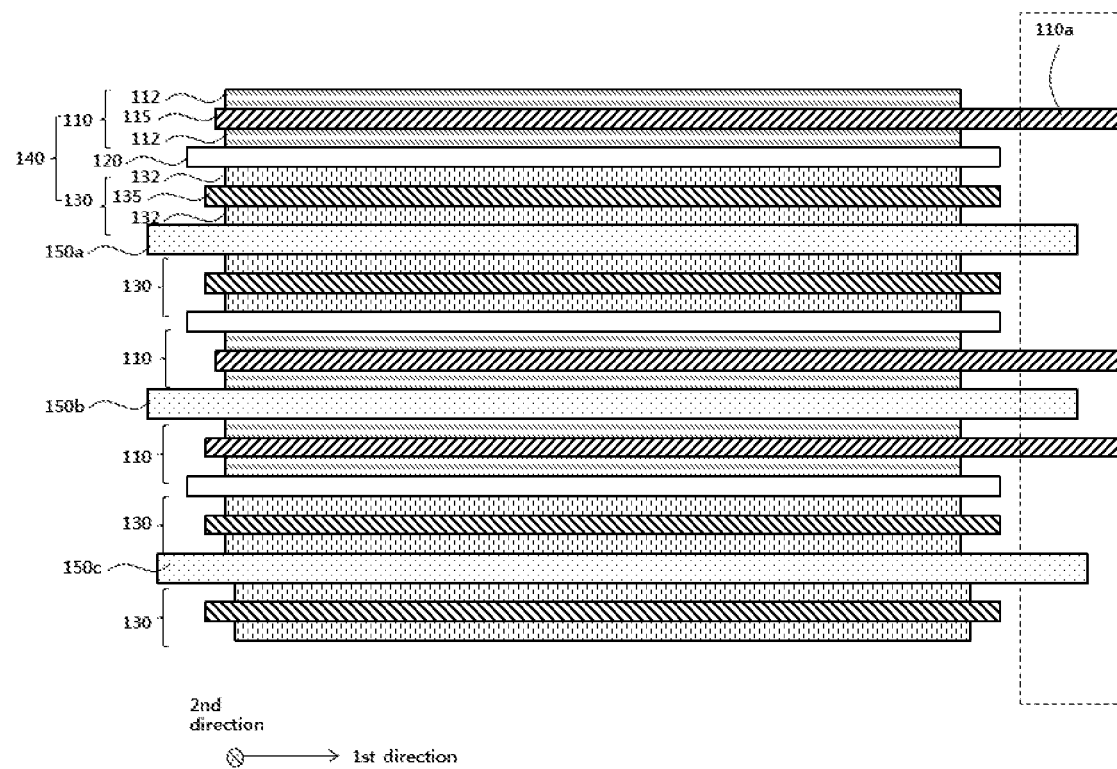
FIGS. 6 and 7 are schematic cross-sectional views illustrating a lithium secondary battery in accordance with some embodiments.
Figure 7:
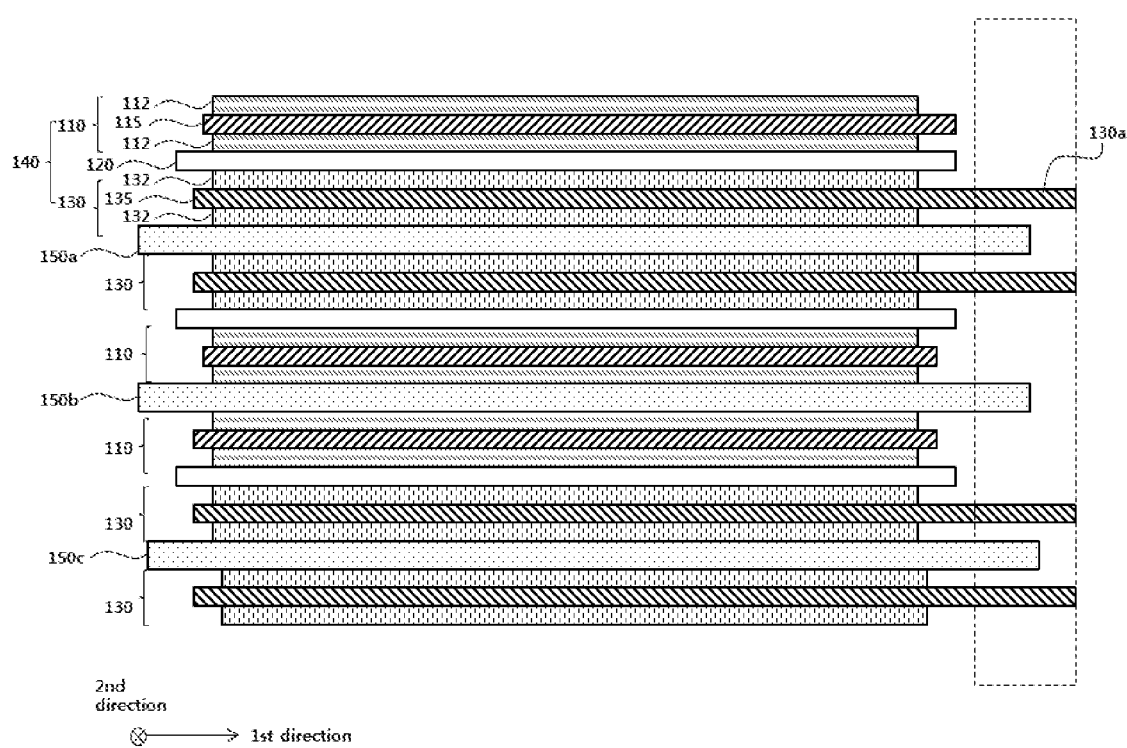

FIGS. 6 and 7 are schematic cross-sectional views illustrating a lithium secondary battery in accordance with some embodiments. For example, FIGS. 6 and 7 are schematic cross-sectional views taken along lines I-I' and III-III', respectively.

Referring to FIGS. 6 and 7, electrodes of the same polarity may face each other with respect to the ion permeation barrier 150.

For example, as illustrated in FIG. 6, the first electrodes 110 may face each other with respect to a second ion permeation barrier 150b. In this case, the first electrode taps 110a may face each other with respect to the second ion permeation barrier 150b in an electrode tap region indicated by a dotted line. Further, the first electrode active material layers 112 included in the different electrode cells 140 may be in contact with a top surface and a bottom surface of the second ion permeation barrier 150b.

Further, as illustrated in FIG. 7, the second electrodes 130 may face each other with respect to each of a second ion permeation barrier 150a and a third ion permeation barrier 150c. In this case, the second electrode taps 130a may face each other with respect to each of the second ion permeation barrier 150a and the third ion permeation barrier 150c in the electrode tap region indicated by a dotted line. Further, the second electrode active material layers 132 included in the different electrode cells 140 may be in contact with top surfaces and bottom surfaces of the first ion permeation barrier 150a and the third ion permeation barrier 150c.

According to embodiments illustrated in FIGS. 6 and 7, the electrodes of the same polarity may face each other with respect to the ion permeation barrier 150. In an embodiment, the first electrodes 110 and the second electrodes 130 may face each other with respect to the ion permeation barrier 150 alternately along a thickness direction of the secondary battery. For example, the second electrodes 130 may face each other with respect to the third ion permeation barrier 150c, the first electrodes 110 may face each other with respect to the second ion permeation barrier 150b, and the second electrodes 130 may face each other with respect to the first ion permeation barrier 150a.

According to embodiments as described above, the ion permeation barrier 150 may serve as an insulation block having an ion conductivity less than that of the separation layer 120 so that the electrodes of the same polarity may face each other. In this case, the ion permeation barrier 150 may be interposed between the electrode taps 110a and 130a which may be welded with each other. Thus, the ion permeation barrier 150 may serve as a penetration barrier in the electrode tap region, and may also serve as a welding guide, a welding supporter or a welding buffer pattern.

For example, the ion permeation barrier 150 may increase a separation area of the electrode taps 110a and 130a included in the different electrode cells 140 in the electrode tap region, and may also serve as a supporter for a welding process.

Hereinafter, preferred embodiments are proposed to more concretely describe the present invention. However, the following examples are only given for illustrating the present invention and those skilled in the related art will obviously understand that various alterations and modifications are possible within the scope and spirit of the present invention. Such alterations and modifications are duly included in the appended claims.

EXAMPLES $LiNi_{0.8}Co_{0.1}Mn_{0.1}O_2$ as a cathode active material, carbon black as a conductive additive and polyvinylidene fluoride as a binder were mixed by a weight ratio of 92:5:3 to form a cathode slurry. The cathode slurry was coated on an aluminum substrate, and then dried and pressed to form a cathode.

An anode slurry was prepared by mixing 92 wt % of a natural graphite as an anode active material, 3 wt % of styrene butadiene rubber (SBR) as a binder, 1 wt % of CMC as a thickener, and 5 wt % of a flake type amorphous graphite. The anode slurry was coated, dried, and pressed on a copper substrate to form an anode.

A polyethylene separator (thickness: 25 μm) was interposed between the cathode and the anode prepared as described above to form an electrode cell. A polyimide-based ion permeation barrier (thickness: 30 μm) was inserted between the electrode cells, and the electrode cells were stacked to form an electrode assembly. The electrode assembly was housed in a pouch and electrode taps were welded. An electrolyte solution was injected, and then the pouch was sealed to form a secondary battery.

The electrolyte solution was prepared by dissolving 1M LiPF6 in a mixed solvent of EC/EMC/DEC (25/45/30; volume ratio), and then 1 wt % of vinylene carbonate, 0.5 wt % of 1,3-propensultone (PRS), and 0.5 wt % of lithium bis (oxalato) borate (LiBOB) were added.

COMPARATIVE EXAMPLES

Secondary batteries of Comparative Examples were fabricated by methods substantially the same as those of Examples except that ion permeation barriers were omitted.

Experimental Example

Five samples of each Example and Comparative Examples were prepared, and a penetration evaluation was conducted. Specifically, the number of the ion permeation barriers was changed while changing a capacity of the secondary battery based on the number of the stacked electrode assemblies.

Each secondary battery was penetrated by a stainless nail having a diameter of 3 mm at a speed of 80 mm/sec, and the number of samples determined as an operationally failed battery was measured. The secondary battery which showed a non-reversible damage or in which a temperature of a cell surface was increased to 300° C. or more was regarded as "failed," and other secondary batteries were regarded as "normal." The results are shown in Table 1 below

TABLE 2

| | Cell Capacity (Ah) | Number of Ion Permeation Barriers | Number of Failed Samples | Number of Normal Samples |
|---|---|---|---|---|
| Example 1 | 20 | 1 | 0 | 5 |
| Example 2 | 40 | 1 | 5 | 0 |
| Example 3 | 40 | 2 | 3 | 2 |
| Example 4 | 40 | 3 | 0 | 5 |
| Example 5 | 60 | 1 | 5 | 0 |
| Example 6 | 60 | 3 | 4 | 1 |
| Example 7 | 60 | 5 | 3 | 2 |
| Example 8 | 60 | 7 | 0 | 5 |
| Comparative Example 1 | 20 | 0 | 5 | 0 |
| Comparative Example 2 | 40 | 0 | 5 | 0 |
| Comparative Example 3 | 60 | 0 | 5 | 0 |

Referring to Table. 1, in Comparative Examples without the ion permeation barriers, all samples were regarded as failed by the penetration evaluation. However, in Examples, a penetration reliability was improved when the number of the ion permeation barriers between the electrode cells was increased.

What is claimed is:

1. A lithium secondary battery, comprising:
   a plurality of electrode cells, each of which includes a first electrode, a second electrode having a different polarity from that of the first electrode and a separation layer interposed between the first electrode and the second electrode;
   an ion permeation barrier between neighboring ones of the electrode cells, the ion permeation barrier having an air permeability less than that of the separation layer;
   a case housing the electrode cells and the ion permeation barrier;
   an electrolyte injected in the case; and
   a first electrode tap and a second electrode tap extending from each of the first electrode and the second electrode, respectively, to an outside of the case.

2. The lithium secondary battery according to claim 1, wherein the ion permeation barrier has a porosity less than that of the separation layer.

3. The lithium secondary battery according to claim 1, wherein the separation layer includes a polymer film prepared from at least one selected from a group consisting of polyethylene, polypropylene, polyvinylidene fluoride, polyethylene oxide and polyacrylonitrile, and
   the ion permeation barrier includes at least one selected from a group consisting of a polyester-based resin, a polyurethane-based resin, a polyimide-based resin, polyethylene terephthalate (PET), polymethyl methacrylate (PMMA), aramid and a polypropylene film filled with an inorganic material.

4. The lithium secondary battery according to claim 1, wherein the first electrode and the second electrode face each other with respect to the ion permeation barrier.

5. The lithium secondary battery according to claim 1, wherein the ion permeation barrier is disposed per each space between the electrode cells.

6. The lithium secondary battery according to claim 5, wherein the first electrodes and the second electrodes face each other with respect to the ion permeation barrier alternately along a thickness direction of the lithium secondary battery.

7. The lithium secondary battery according to claim 1, wherein the ion permeation barrier at least partially overlaps the first electrode tap and the second electrode tap in the case along a thickness direction of the lithium secondary battery.

8. The lithium secondary battery according to claim 7, wherein an electrode tap region is defined between end portions of the electrode cells and the case, and
wherein a portion of the ion permeation barrier extends to the electrode tap region.

9. The lithium secondary battery according to claim 7, wherein the ion permeation barrier has a length in an extending direction of the first and second electrode taps larger than that of the separation layer.

10. The lithium secondary battery according to claim 7, wherein the separation layer has a length in a width direction of the lithium secondary battery larger than that of the ion permeation barrier.

11. The lithium secondary battery according to claim 10, wherein the separation layer extends in a zigzag shape along the thickness direction and the width direction by a connecting portion.

12. The lithium secondary battery according to claim 1, wherein the first electrode includes a first current collector and a first electrode active material layer coated thereon, the second electrode includes a second current collector and a second electrode active material layer coated thereon, and
the first electrode active material layer and the second electrode active material layer are coated on both surfaces or a single surface of the first current collector and the second current collector, respectively.

13. The lithium secondary battery according to claim 12, wherein
the first electrode contacts the ion permeation barrier, and the first electrode active material layer is coated on the single surface of the first current collector.

14. The lithium secondary battery according to claim 13, wherein the ion permeation barrier directly contacts the first current collector.

15. A lithium secondary battery, comprising:
a plurality of electrode cells, each of which includes a first electrode, a second electrode having a different polarity from that of the first electrode, and a separation layer interposed between the first electrode and the second electrode; and
an ion permeation barrier between neighboring ones of the electrode cells, the ion permeation barrier having an air permeability less than that of the separation layer,
wherein the separation layer includes a polymer film prepared from at least one selected from a group consisting of polyethylene, polypropylene, polyvinylidene fluoride, polyethylene oxide, and polyacrylonitrile, and
the ion permeation barrier includes at least one selected from a group consisting of a polyester-based resin, a polyurethane-based resin, a polyimide-based resin, polyethylene terephthalate (PET), polymethyl methacrylate (PMMA), aramid, and a polypropylene film filled with an inorganic material.

* * * * *